(12) United States Patent
Rose et al.

(10) Patent No.: US 8,737,384 B2
(45) Date of Patent: May 27, 2014

(54) PEER-TO-PEER, INTERNET PROTOCOL TELEPHONE SYSTEM WITH AUTO-ATTENDANT

(75) Inventors: Christopher Rose, Surrey (CA); Gerry Knopp, Calgary (CA); Jen T'ai Chitty, Surrey (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 152 days.

(21) Appl. No.: 12/987,862

(22) Filed: Jan. 10, 2011

(65) Prior Publication Data
US 2012/0177031 A1    Jul. 12, 2012

(51) Int. Cl.
*H04L 12/66*    (2006.01)
(52) U.S. Cl.
USPC ............................................. 370/352
(58) Field of Classification Search
CPC ...................................................... H04L 12/66
USPC .......... 370/256, 260; 707/206, 622; 709/217, 709/225; 717/173; 380/279
See application file for complete search history.

(56) References Cited

U.S. PATENT DOCUMENTS

| | | | |
|---|---|---|---|
| 7,263,528 B2 * | 8/2007 | Haff et al. ..................... | 707/622 |
| 7,941,537 B2 * | 5/2011 | Ludwig et al. ................. | 709/226 |
| 8,239,485 B2 * | 8/2012 | Courtay et al. ............... | 709/217 |
| 2002/0112023 A1 * | 8/2002 | Karamanolis et al. ........ | 709/217 |
| 2005/0007964 A1 * | 1/2005 | Falco et al. .................... | 370/256 |
| 2005/0027802 A1 * | 2/2005 | Madsen et al. ................ | 709/204 |
| 2005/0144279 A1 * | 6/2005 | Wexelblat ...................... | 709/225 |
| 2006/0067249 A1 * | 3/2006 | Poustchi et al. .............. | 370/260 |
| 2006/0068703 A1 * | 3/2006 | Ng et al. ....................... | 455/41.2 |
| 2006/0194589 A1 * | 8/2006 | Sankisa ....................... | 455/456.1 |
| 2007/0047458 A1 * | 3/2007 | Adkisson ...................... | 370/252 |
| 2007/0067373 A1 * | 3/2007 | Higgins et al. ............... | 707/206 |
| 2007/0149130 A1 * | 6/2007 | Dunham .................... | 455/67.11 |
| 2008/0189440 A1 * | 8/2008 | Goyal et al. .................. | 709/248 |
| 2009/0024991 A1 * | 1/2009 | Campbell et al. ............. | 717/173 |
| 2009/0060201 A1 * | 3/2009 | Rhodes et al. ............... | 380/279 |
| 2011/0004584 A1 * | 1/2011 | Goyal et al. .................. | 707/622 |

* cited by examiner

*Primary Examiner* — Asad Nawaz
*Assistant Examiner* — Parth Patel
(74) *Attorney, Agent, or Firm* — Steptoe & Johnson LLP

(57) ABSTRACT

Various embodiments of the invention provide a Peer-to-Peer (P2P, Internet Protocol (IP) telephone system. The telephone system includes a plurality of terminals coupled together via an IP network. The terminals cooperate with one another to provide telephony features without a dedicated central controller such as a PBX and/or a KSU controller. The terminals may store system-wide configuration data and files referenced by the system-wide configuration data. The terminals may further determine whether the system-wide configuration data references a file that is not stored in the terminal, and requesting the file from another terminal of the telephone system in response to determining the terminal does not have a copy of the file.

8 Claims, 7 Drawing Sheets

PEER-TO-PEER, INTERNET PROTOCOL TELEPHONE SYSTEM WITH AUTO-ATTENDANT

FIELD OF THE INVENTION

The present invention relates to Peer-to-Peer (P-2P), Internet Protocol (IP) telephone systems. More specifically, certain embodiments of the invention relate to a maintaining files across terminals of P2P, IP telephone systems.

BACKGROUND OF INVENTION

Small enterprise environments typically desire telephone systems that provide a variety of communication features. For example, small enterprise environments typical desire telephones systems that provide internal intercom calls from one telephone terminal to another telephone terminal within the telephone system while still supporting external public switched telephone network (PSTN) calls between a telephone terminal within the system and an external telephone system connected to the PSTN. Other features desired by small enterprise environments may include call conferencing, call transferring, and voice mail functions.

A Peer-to-Peer (P2P), Internet Protocol (IP) telephone system may provide such features. Certain terminals in a P2P, IP telephone system may need access to certain configuration data (e.g., voice prompt files) that are too large to distribute to every terminal within the telephone system. For example, certain terminals (e.g., a basic IP telephone terminal) may not need access to such configuration data and may also have insufficient storage capabilities to store such configuration data.

SUMMARY OF INVENTION

Aspects of the present invention are directed to methods, systems, and apparatus, substantially as shown in and/or described in connection with at least one of the figures and as set forth more completely in the claims.

These and other advantages, aspects and novel features of the present invention, as well as details of illustrative aspects thereof, will be more fully understood from the following description and drawings.

DETAILED DESCRIPTION

Aspects of the invention may be found in a method and apparatus that provide a user interface configured to update configuration data in a peer-to-peer (P2P), Internet Protocol (IP) telephone system. Certain embodiments of the invention provide a small enterprise telephone system comprising two or more telephone terminals that coordinate between themselves to implement private branch exchange (PBX) and/or key services unit (KSU) type functionality without the use of a central PBX and/or KSU controller. An Internet Protocol (IP) network is used to support communication and coordination between the telephone terminals. Each telephone terminal supports features and functions that may be offered as resources to the telephone system as a whole and may be shared between the various telephone terminals. One or more of the terminals may provide a network-accessible user interface (UI) that permits a user of the system to change configuration data distributed among various terminals of the system.

Due to its P2P nature, the small enterprise telephone system may be expanded with a high degree of flexibility according to the desires of a small enterprise. In particular, telephone terminals with different features may be added and/or removed from the telephone system in order to provide the small enterprise with a desired feature set. For example, telephone terminals may include but are not limited to (a) telephone terminals with corded handset, keypad and display, (b) telephone terminals with corded handset, keypad, display, and a PSTN telephone jack to support calls using a public switched telephone network (PSTN), (c) basic telephone terminals with corded handset, keypad, display, and a telephone answering device that provide voice mail functions, and (d) wireless telephone terminals that connect to the IP network via a wireless IP link.

Figure 1:
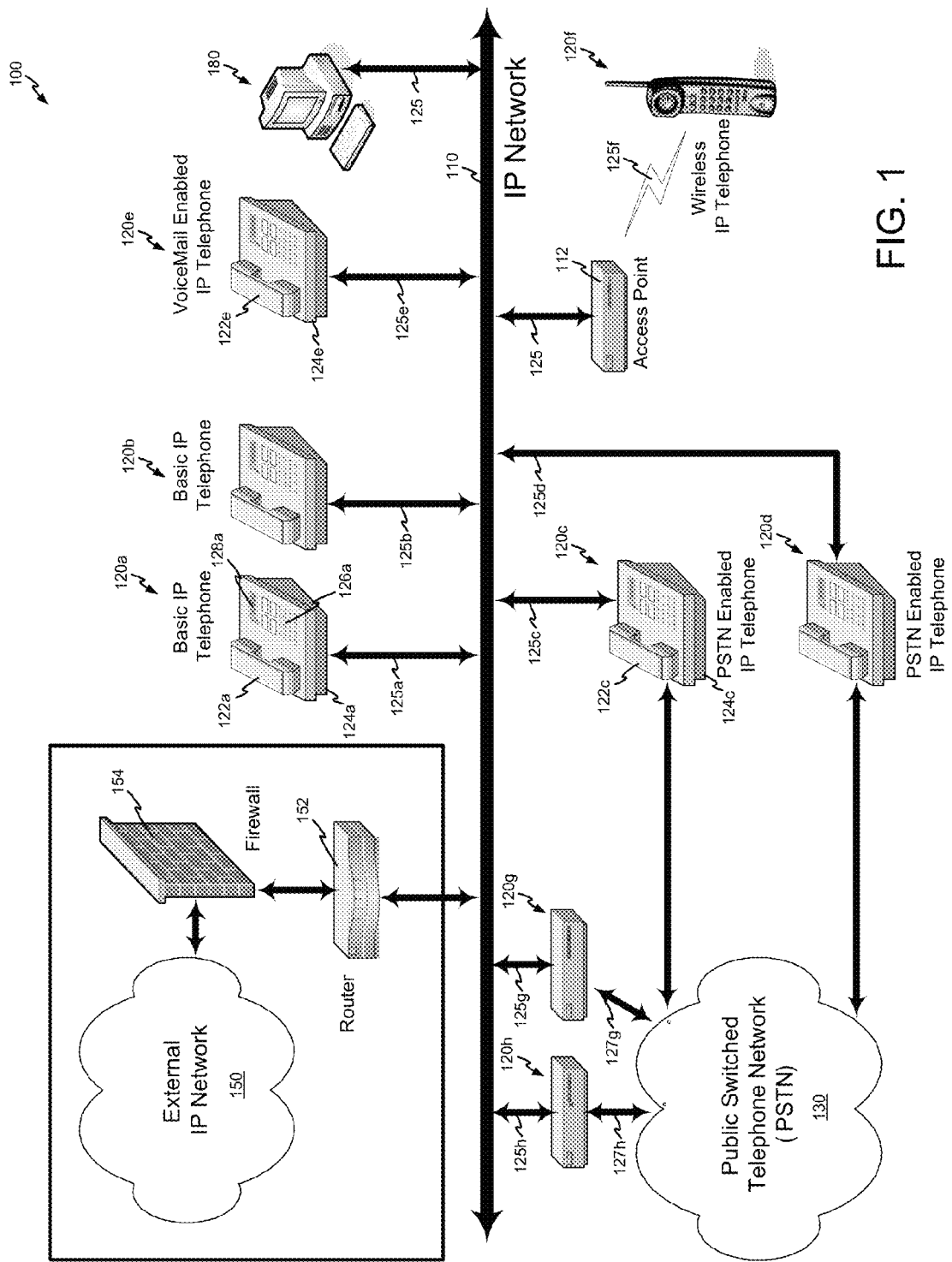
FIG. 1 is a diagram that illustrates a peer-to-peer (P2P), internet protocol (IP) telephone system, in accordance with an embodiment of the invention.

Referring now to FIG. 1, a small enterprise telephone system 100 that uses an IP network 110 to support communication between a plurality of terminals 120 (e.g. IP telephone terminals 120*a-f* and gateways 120*g-h*) is shown. Unlike conventional Voice over Internet Protocol (VoIP) telecommunications system, the telephone system 100 does not include a central controller node, such as a PBX and/or KSU controller. Rather, control and switching for the telephone system 100 is coordinated among the telephone terminals 120.

As shown, the system 100 uses an IP network 110 to communicatively couple the plurality of telephone terminals 120 to one another. In one embodiment, the IP network 110 is implemented with a fast Ethernet network (e.g., 10/100baseT). However, the IP network 110 may be implemented using other types of IP based networks such as, for example, wireless 802.11 wireless networks, HomePlug power-line networks, public Internet network, etc.

FIG. 1 shows different types of IP telephone terminals 120. In particular, telephone terminals 120*a*, 120*b* are depicted as basic IP telephone terminals coupled to the IP network 110 via wired IP connections 125*a*, 125*b* (e.g., a Cat 5 Ethernet cable). The basic IP telephone terminal 120*a* may include a handset 122*a* and base unit 124*a*, which provide a voice interface and a user interface to the system 100. In particular, the handset 122*a* may be coupled to the base unit 124*a* via a cord (not shown).

The handset 122*a* and base unit 124*a* may each include a microphone and speaker (not shown). As a result, a user may interact with the telephone system 100 via the voice interface provide by the handset 122*a* which receives voice input from a user and outputs audio signals to the user via its microphone and speaker. Alternately, a user may elect to interact with the telephone system 100 via the voice interface provided by the base unit 124a, which receives voice input from a user and outputs audio signals to the user via its microphone and speaker when operating in a speakerphone mode of operation.

In addition to the voice interface, the handset 122a and the base unit 124a may each include a keypad 126a and display 128a which provide a user interface to the system 100. The keypad 126a may permit a user to input digits and/or other information via one or more key presses, and the display 128a may provide the user with textual and/or graphical information. Furthermore, the base unit 124a may include an network interface configured to transmit and receive IP packets over the IP network 110. The base unit 124a may also include circuitry (e.g., processor, microcontroller, data storage devices, etc.), software, and/or firmware configured to conduct a telephone call over the IP network 110.

Besides basic IP terminals 120a, 120b, the telephone system 100 may further include PSTN enabled IP telephone terminals 120c, 120d that are coupled to the IP network 110 via wired IP connections 125c, 125d. In particular, the telephone terminal 120c may include a handset 122c and base unit 124c that provide the telephone terminal 120c with functionality similar to that provided by the basic IP telephone terminals 120a, 120b. However, the handset 122c and base unit 124c further include a PSTN interface and corresponding circuitry to convert signals between the PSTN 130 and the IP network 110. In particular, the telephone terminals 120c, 120d include circuitry configured to handle on-hook/off-hook signaling, the detection of incoming PSTN calls, the reception of call ID (CID) signals, the generation of outgoing dialing tones/pulses, and the conversion of voice signals. In one embodiment, the IP telephone functionality of the telephone terminals 120c, 120d are functionally independent of the PSTN interface functionality, thus permitting simultaneous usage of both the IP telephone functionality and the PSTN interface functionality of the terminals 120c, 120d.

As shown, the telephone system 100 may further include VoiceMail (VM) enabled IP telephone terminal 120e that is coupled to the IP network 110 via a wired IP connection 125e. The telephone terminal 120e includes a handset 122e and base unit 124e that provide the telephone terminal 120e with functionality similar to that provided by the handset and base unit of the basic IP terminal 120a. The base unit 124e, however, further includes an integrated telephone answering device, which may provide voicemail features to all of the telephone terminals 120 of the telephone system 100.

The telephone system 100 may also include a wireless IP telephone terminal 120f that is coupled to the IP network 110 via a wireless IP connection 125f and a wireless access point 112. The wireless IP telephone terminal 120f may provide functionality similar to that provided by the basic IP telephone terminals 120a, 120b. However, unlike the basic IP telephone terminals 120a, 120b, the wireless IP telephone terminal 120f is not tethered to the telephone system 100 by a wired IP connection, thus permitting the user of the wireless IP telephone 120f greater mobility.

The telephone system 100 may also include gateway terminals 120g-h. Each gateway terminal 120g-h may be connected to the IP network 110 via a respective wired connections 125g-h and to the PSTN 130 by one or more (e.g., four) wired connections 127g-h. Each gateway terminal 120g-h in one embodiment operates in a manner similar to the PSTN-enabled, IP telephone terminals 120c-d by providing PSTN connectivity to other terminals 120 of the telephone system 100.

The telephone system 100 may further include one or more computing devices 180 such as a laptop computer, desktop computer, workstation, handheld device, and/or other device that may be coupled to the IP network 110. The computing device 180 may include digital circuitry (e.g., processors, memory, and control logic), software and/or firmware, and user interface hardware (e.g., keyboard, mouse, display, etc.) that in combination present a user with a client suitable for interacting with a network-accessible interface of the terminals 120.

Each telephone terminal 120 provides one or more resources that contribute to the entire functionality of the telephone system 100. The PSTN-enabled, IP telephone terminal 120c, for example, provides to a user of the telephone terminal 120c (a) a user extension resource for voice communication, (b) a user display resource for messaging purposes, and (c) a user keypad resource for user input. Moreover, the PSTN-enable, IP telephone terminal 120c provides a PSTN interface resource for not only the PSTN-enabled, IP telephone terminal 120c but the other IP telephone terminals 120 of the telephone system 100. Similarly, the VM-enabled, IP telephone terminal 120d provides VM functionality not only to the user of the VM-enable telephone terminal 120d, but also to the other IP telephone terminals 120 of the telephone system 100. Furthermore, the gateway terminals 120g-h, in one embodiment, provide an auto-attendant feature for the other terminals 120 of the telephone system 100. The auto-attendant feature is described in further detail below.

The IP telephone terminals 120 described above are not an exhaustive set of the terminals that may be added to the telephone system 100. Other types of P2P terminals are contemplated and may be added to the telephone system 100 in order to expand the overall functionality of the telephone system 100. For example, the telephone system 100 may further include terminals which provide only a PSTN interface (e.g., a terminal similar to terminals 120, but without a telephone handset), terminals which provide only VoiceMail functionality (e.g., a terminal similar to terminal 120e, but without a telephone handset), a video IP phone terminal which supports video IP communication, and other terminal configurations.

As shown, the telephone system 100 may also include an interface between the local IP network 110 and an external IP network 150 (e.g., the Internet). Such an interface may include a router 152 and/or firewall device 154. While not essential for the operation of the telephone system 100, such an external interface supports communication between IP telephone terminals 120 within the telephone system 100 and IP telephone terminals 120 external to the telephone system 100, whether they be at a remote office (acting as an extension to the telephone system 100) or at a third party site (either a VoIP service provider or an IP based end terminal).

Due to its P2P nature, the telephone system 100 uses various non-conventional techniques to provide operation and features comparable to those available in conventional PBX and/or KSU systems. One such technique relates to discovery of terminals such as IP telephone terminals 120. In response to a terminal 120 being connected to the telephone system 100, the newly added terminal 120 performed two tasks. First, the new terminal 120 discovers which other terminals 120 are already connected to the telephone system 100, their capabilities (resource set), and their addresses so that the terminal 120 may configure itself for use in the telephone system 100. Second, the newly added terminal 120 announces its presence on the telephone system 100 to notify existing terminals 120 of its capabilities and address.

In one embodiment, an extension of the DHCP (Dynamic Host Configuration Protocol) is used to implement the discovery process. In such an embodiment, a newly connected terminal 120 broadcasts on the system 100 a request for DHCP services which typically assigns an IP address to the new terminal 120. In particular, the new terminal 120 may identify itself (e.g., a VoIP terminal) with the DHCP request. Existing terminals 120 of the telephone system 100 may also receive the broadcast DHCP request and response and update their configuration information accordingly so that they may directly communicate with the newly added terminal 120 at the addressed assigned by the DHCP server. Other terminals 120 already on the system 100 also receive the DHCP broadcast. While an extension of the DHCP protocol may be used, other embodiments may implement terminal discovery using another protocol. For example, other embodiments may use other protocols such as, for example. the BOOTP protocol, the Web Proxy Autodiscovery (WPAD) protocol, the Zeroconf protocol, the Boot Service Discovery Protocol (BSDP), the Universal Plug and Play (UPnP) set of protocols, and/or a custom protocol.

As an example of a custom protocol, a newly added terminal 120 may listen for beacon signals on the IP network 110 to determine whether a telephone system 100 is established. In response to a beacon signal, the terminal 120 may request the sender of the beacon signal (e.g., a Master Coordinator as explained in detail below in regard to FIG. 2-4) to join the telephone system 100. The newly added terminal 120 may then wait for a beacon signal that indicates system-wide configuration data has been updated. The updated system-wide configuration data may include an extension number for the terminal 120 which advises the newly added terminal and other terminals 120 in the telephone system 100 of the resources available in the new terminal 120.

Once terminals 120 are aware of other terminals on the system 100, the terminals 120 may configure themselves. For example, a newly added terminal 120 in the system 100 may be able to detect, for example, that there are other terminals 120 with extension numbers 10, 11 and 12. The newly added terminal 120 may be able to automatically configure itself to be extension number 13, and may then advise the other terminals 120 of its selected extension number. However, if the newly add terminal 120 had been previously configured with the extension number 14, then the terminal 120 may retain this extension number. Similarly, if this newly added terminal 120 has PSTN interface, then the existing terminals 120 may re-configure themselves to support use of this newly available PSTN telephone line. Further details regarding updating configuration data which may be used by some embodiments is presented below.

The telephone system 100 in certain embodiments supports resource sharing. As a result of such resource sharing, a small enterprise may continually expand the telephone system 100 by installing new terminals 120. For example, if a user of terminal 120a desires to make a PSTN call, the terminal 120 may send a message to terminal 120c requesting use of it's PSTN interface. Terminal 120a, in one embodiment, already knows that terminal 120c has a PSTN interface due to the discovery process. If the PSTN interface of terminals 120c is not already in use, then terminal 120c may assign the PSTN resource to terminal 120a. If further requests for the PSTN resource arrive at terminal 120c while still being assigned to terminal 120a, then terminal 120c may deny such additional requests until terminal 120a has completed it's use of the PSTN resource. Terminal 120a may then forward a message to terminal 120c which requests terminals 120c to dial the appropriate telephone number for PSTN call on the PSTN network 130, and establish a VoIP connection between the PSTN network 130 and terminal 120a.

In some embodiments, terminal 120c may still be available for calls on the IP network 110 since the PSTN interface to the PSTN network 130 and VoIP interface to the IP network 110 are implement as independent resources in some embodiments. Furthermore, if a user at terminal 120c wishes to make a PSTN call while its PSTN interface is still assigned to terminal 120a, terminal 120c may request use of the PSTN interface of terminal 120d to facilitate this PSTN call. In this way, any IP telephone terminal 120 in the telephone system 100 has the ability to access any PSTN connection.

Other resources, such as a voice mail system, may be shared among the terminals 120 in a similar fashion. Once a terminal 120 is finished with a resource, a message is sent to the associated terminal 120 indicating the resource may be released and made available for other requests from the telephone system 100. The terminals 120 may also implement a time-out mechanism to ensure the telephone system may recover from error conditions such as a terminal 120 being disconnected from the IP network when in control of a resource of another terminal 120.

The telephone system 100 may further include distributed control aspects. In particular, each of the terminals 120 may include circuitry, software, and/or firmware which determine how to best facilitate a user's request. In a conventional PBX and/or KSU system, a central PBX and/or KSU server controls of all resources of the telephone system. In the P2P telephone system 100, each terminal 120 controls only those resources that are part of its hardware, and loans them to other terminals 120 based on resource requests. The distributed control enables a terminal 120 to resolve conflicts where the terminal 120 may receive simultaneous resource requests, as well as enabling terminals 120 to determine where in the telephone system 100 to seek specific resources As mentioned above, the telephone system 100 is a P2P telephone system in which the terminals 120 communicate directly with each other without the coordination efforts of a central controller such as a PBX and/or KSU central controller. For proper operation of the telephone system 100, the terminals 120 include configuration data that is shared among all terminals 120 within the telephone system 100. For example, the configuration data shared among the terminals 120 may include a list of all the telephone terminals 120 and corresponding extension numbers. It is not practical for an end-user to manually update all terminals 120 in the telephone system 100 to contain the same configuration data. Moreover, the telephone system 100 does not contain a dedicated central controller for coordinating the dispersal of such configuration data. Accordingly, each terminal 120 of the telephone system 100 implements a process that automatically propagates configuration data throughout the P2P, IP telephone system 100.

Figure 2:
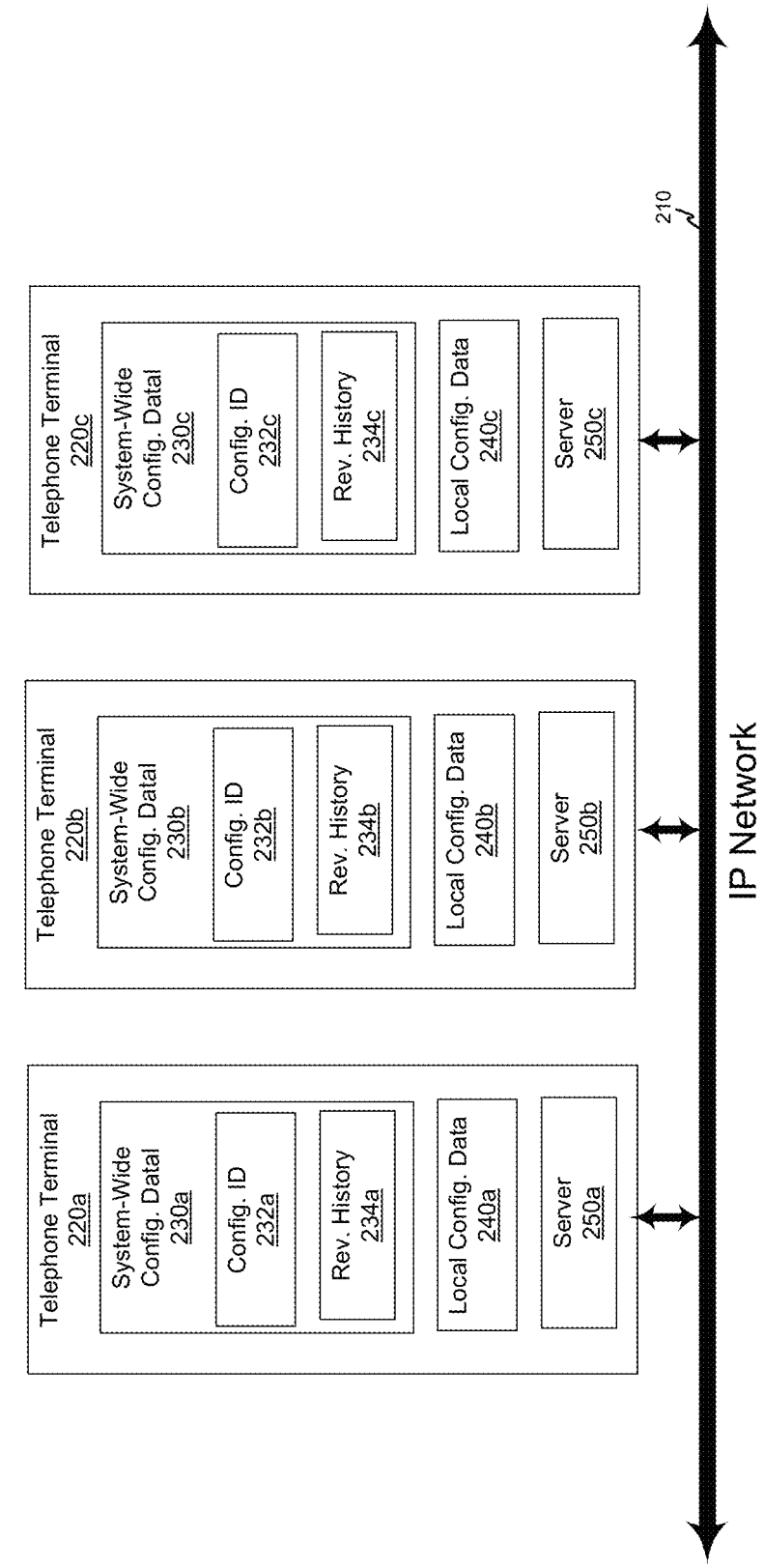
FIG. 2 is a simplified diagram of a P2P, IP telephone system, in accordance with an embodiment of the invention.
Figure 3:
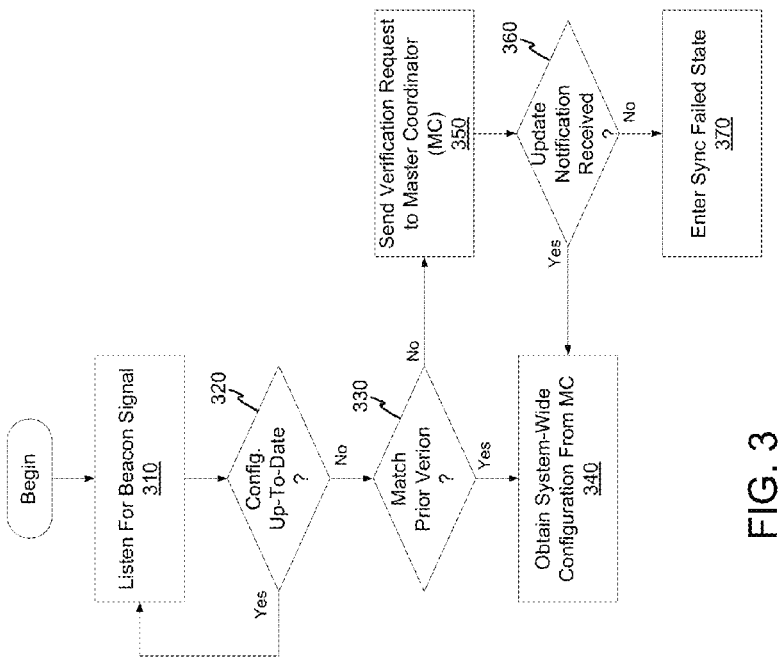
FIG. 3 is a flowchart of a method used by a peer terminal of the P2P, IP telephone system of FIG. 2 to determine whether its stored system-wide configuration data is up-to-date.
Figure 4:
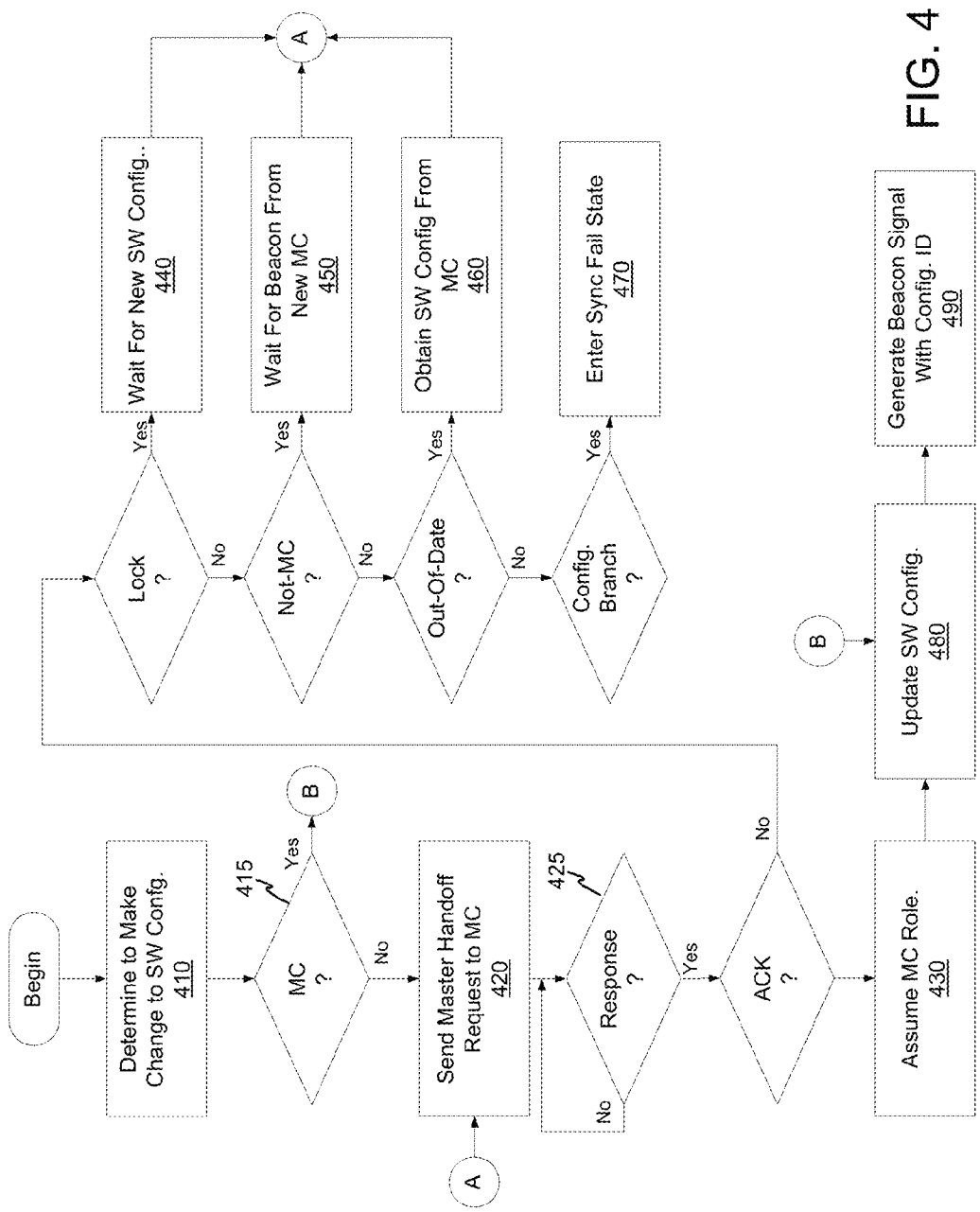
FIG. 4 is a flowchart of a method used by the terminals of the P2P, IP telephone system of FIG. 2 to update the system-wide configuration data.

Details of such a process are described in reference to FIGS. 2-4, where FIG. 2 shows a simplified block diagram of the telephone system 100 that highlights aspects of a P2P, IP telephone system which relate to configuration data and propagating such configuration data throughout the P2P, IP telephone system. In particular, FIG. 2 shows a telephone system 200, which may be implemented in a manner similar to the telephone system 100 of FIG. 1. The telephone system 200 is shown with a first terminal 220a, a second terminal 220b, and a third terminal 220c coupled to one another via an IP network 210. While telephone system 200 is shown with three terminals 220, other embodiments of a P2P, IP telephone system may include a different number of terminals 220.

As shown, each terminal 220a-c may include system-wide configuration data 230a-c, local configuration data 240a-c, and a server 250a-c configured to maintain the system-wide configuration data 230a-c. The local configuration data 240*a-c* may include configuration data to configure and/or customize the operation of the respective terminal 220*a-c*. Moreover, other terminals 220*a-c* of the system 200 may have no interest and/or need to know the local configuration data 240*a-c* of another terminal 220*a-c* in order to properly operate within the P2P context of the telephone system 200. For example, the local configuration data 240*a* stored in terminal 220*a* may include data regarding the capabilities of its speakers, its handset and base unit microphones, and its display, etc.

Conversely, the system-wide configuration data 230*a-c* generally relates to configuration data which terminals 220*a-c* of the system 200 require in order to properly configure themselves for operation within the P2P, IP telephone system 200. For example, the system-wide configuration data 230*a-c* may include a list of terminals 220*a-c* in the system 200, addresses assigned to the terminals 220*a-c*, extension numbers assigned to the terminals 220*a-c*, resources provided by each of the terminals 220*a-c*, a telephone directory, etc. Thus, while the local configuration data 240*a-c* may differ between terminals 220*a-c*, the system-wide configuration data 230*a-c* in one embodiment is the same in each terminal 220*a-c* assuming each terminal 220*a-c* has the latest system-wide configuration data 230*a-c* for the system 200.

As shown, the system-wide configuration 230*a-c* may further include a configuration identifier 232*a-c* and a revision history 234*a-c*. The configuration identifier 232*a-c* provides a unique identifier for each version of the system-wide configuration data 230*a-c*. As such, if the configuration identifiers 232*a-c* of two terminals 220*a-c* match, then the stored system-wide configuration data 230*a-c* of the two terminals 220*a-c* match. Conversely, if the configuration identifiers 232*a-c* of two terminals 220*a-c* do not match, then the stored system-wide configuration data 230*a-c* of the two terminals 220*a-c* do not match.

The revision history 234*a-c* may include configuration identifiers 232*a-c* for one or more prior versions of the system-wide configuration data 230*a-c*. In one embodiment, the revision history 234*a-c* retains a limited number of configuration identifiers. The number of configuration identifiers maintained by the revision history 234*a-c*, in one embodiment, is chosen such that if a terminal 220*a-c* is powered down or disconnected from the IP network 210 for a reasonable period of time, the terminal 220*a-c* is likely to still contain system-wide configuration data 230*a-c* having an configuration identifier 232*a-c* in the revision history 234*a-c* of the other terminals 220*a-c* when reconnected to the IP network 210. As such, if the configuration identifier 232*a-c* of a terminal 220*a-c* matches a configuration identifier of the revision history 234*a-c*, then the system-wide configuration data 230*a-c* of the terminal 220*a-c* corresponds to a prior, out-of-date version of the system-wide configuration data 230*a-c*. Conversely, if the configuration identifier 232*a-c* of a terminal 220*a-c* does not match a configuration identifier of the revision history 234*a-c*, then the system-wide configuration data 230*a-c* of the terminal 220*a-c* may be a branch of the system-wide configuration data 230*a-c* and may not correspond to a prior version of the system-wide configuration data 230*a-c*. However, since the revision history 234*a-c* stores a limited number of prior configuration identifiers, the absence of a match may simply be an indication that the system-wide configuration data 230*a-c* corresponds to an older version of the system-wide configuration data 230*a-c* that is no longer present in the revision history 234*a-c*.

Thus, each terminal 220*a-c* may use its the system-wide configuration data 230*a-c* to configure itself for proper operation in the telephone system 200. Moreover, as explained in more detail below, the each terminal 220*a-c* may use the its configuration identifier 232*a-c* to determine whether its stored system-wide configuration data 230*a-c* is the latest system-wide configuration data 230*a-c* for the P2P, IP telephone system 200.

To this end, the server 250*a-c* of each terminal 220*a-c* is configured to determine whether its system-wide configuration data 230*a-c* corresponds to the latest system-wide configuration data 230*a-c* for the system 200. If a server 250*a-c* determines that its system-wide configuration data 230*a-c* is not the latest configuration data for the telephone system 200, the server 250*a* is configured to obtain the latest system-wide configuration data via servers 250*a-c* of another terminal 220*a-c* and to update its copy of the system-wide configuration data 230*a-c* accordingly. Moreover, the servers 250*a-c* of the terminals 220*a-c* may provide an interface to changes the system-wide configuration data 230*a-c* and propagate such changes to terminals 220*a-c* throughout the system 200.

In some embodiments, each server 250*a-c* includes an hypertext transfer protocol (HTTP) server and associated business logic to maintain the system-wide configuration data 230*a-c* in the manner described below. To this end, each terminal 220*a-c* may include digital circuitry (e.g., processors, memory, and control logic) as well as software and/or firmware that in combination receive, transfer, and update the system-wide configuration data 230*a-c* in a manner as described below. While each server 250*a-c*, in one embodiment, may includes a HTTP server and associated business logic to receive, transfer, and update the system-wide configuration data 230*a-c*, other embodiments may utilize other data transfer protocols, servers, and/or clients in order to receive, transfer, and update the system-wide configuration data 230*a-c*.

Given the P2P nature of the telephone system 200, each terminal 220*a-c* may play the role of server and the role of client. In regard to maintaining the system-wide configuration data 230*a-c*, the telephone system 200 introduces the role of Master Coordinator (MC). In one embodiment, any terminal 220*a-c* of the telephone system 200 may obtain the role of Master Coordinator; however, the terminals 220*a-c* coordinate with one another such that only a single terminal 220*a-c* of the telephone system 200 plays the role of Master Coordinator at a given time. The terminal 220*a-c* with the Master Coordinator role may periodically (e.g., every 2 seconds) broadcast a beacon signal over the IP network 210 that is received by the other terminals 220*a-c* of the telephone system 200. In one embodiment, the beacon signal includes at least (i) a system identifier which enables multiple P2P, IP telephone systems to coexist on the same IP network 210, and (ii) a configuration identifier for its stored system-wide configuration data 230*a-c*. The terminals 220*a-c* are configured such the terminal 200*a-c* with the Master Coordinator roles has the most up-to-date version of the system-wide configuration data 230*a-c*. As such, the peer terminals 220*a-c* may determine whether their stored copies of the system-wide configuration data 230*a-c* are in sync with the system-wide configuration data 230*a-c* of the Master Coordinator and therefore up-to-date.

In some embodiments, the beacon signal further includes (iii) a configuration identifier for a prior version of the system-wide configuration data 230*a-c*. The configuration identifier for a prior version enables the peer terminals 220*a-c* to determine that their stored copies of the system-wide configuration data 230*a-c* are merely out-dated and not possibly a separate branch from the most current system-wide configuration data. If merely out-dated, a peer terminal 220*a-c* may update its stored system-wide configuration data 230*a-c* to the latest version of the system-wide configuration data 230*a-c* without losing configuration data. However, if a peer terminals 220*a-c* determines the configuration identifier for the stored system-wide configuration data 230*a-c* does not match a prior revision of the system-wide configuration data 230*a-c*, then its configuration data may include configuration not found in the most current system-wide configuration data 230*a-c*. As such, the peer terminal 220*a-c* may not be able to update to the latest version of the system-wide configuration data 230*a-c* without losing important configuration data. In such situations, manual intervention may be required in order to resolve conflicts in configuration data and properly configure the peer terminal 220*a-c*.

Referring now to FIG. 3, a method 300 used by a peer terminal to determine whether its stored system-wide configuration data is up-to-date is shown. In order to simplify the following description of method 300, terminal 220*a* is assumed to have the Master Coordinator role and terminal 220*b* is assumed to have a peer role. While the method 300 is described from the standpoint of terminal 220*b*, it should be appreciated that any of the terminals 220*a-c* when acting in the peer role may operate in accordance with the following described method 300.

As shown at 310, the peer terminal 220*b* of the telephone system 200 may listen on the IP network 210 for a periodic beacon signal transmitted by Master Coordinator terminal 220*a*. At 320, the peer terminal 220*b*, in response to receiving the beacon signal, may determine whether its stored system-wide configuration data 230*b* is up-to-date. In particular, the peer terminals 220*b* may compare the configuration identifier of the beacon signal with its configuration identifier 232*b*. If the configuration identifier of the beacon signal matches the configuration identifier 232*b*, then the terminal 220*b* may determine that its stored system-wide configuration data 230*b* is up-to-date. In which case, the terminal 220*b* may return to 310 in order to listen for the next beacon signal.

However, if the configuration identifier of the beacon signal is different than its configuration identifier 232*b*, then the peer terminal 220*b* may determine that its stored system-wide configuration data 230*b* is no longer in sync with the system-wide configuration data 230*a* of the Master Coordinator 220*a*. In which case, the peer terminal 220*b* may proceed to 330 to determine the appropriate action to take.

At 330, the peer terminal 220*b* may determine whether its configuration identifier 232*b* matches a prior version configuration identifier provided by the beacon signal. In particular, the beacon signal in one embodiment includes both the configuration identifier for the current version of the system-wide configuration data 230*a* and the configuration identifier for the immediate prior version of the system-wide configuration data. As such, if the peer terminal 220*b* determines that its configuration identifier 232*b* matches the configuration identifier of the beacon signal for the immediate prior version of the system-wide configuration data, then the peer terminal 220*b* may determine that it can safely update its system-wide configuration data 230*b* to that of the Master Coordinator terminal 220*a*. Accordingly, the peer terminal 220*b* at 340 may obtain the system-wide configuration data 230*a* from the Master Coordinator terminal 220*a* and update its system-wide configuration data 230*b* to the obtained system-wide configuration data 230*a*. In one embodiment, the peer terminals 220*b* obtains the system-wide configuration data 230*b* via an HTTP Get request. However, it should be appreciated that other techniques and protocols may be used to obtain the system-wide configuration data 230*a* from the Master Coordinator terminal 220*a*.

If the peer terminal 220*b* determines its configuration identifier 232*b* does not match the prior version configuration identifier provided by the beacon signal, then the peer terminal 220*b* at 350 may send a verification request to the Master Coordinator terminal 220*a*. In particular, the peer terminal 220*b* includes its configuration identifier 232*b* in the verification request so that the Master Coordinator terminal 220*a* may determine whether the configuration identifier 232*b* matches a configuration identifier of its revision history 234*a*. If the configuration identifier 232*b* is present within the revision history 234*a* of the Master Coordinator terminal 220*a*, then the Master Coordinator terminal 220*a* may determine that the peer terminal 220*b* has a prior version of its system-wide configuration data 230*a*. In which case, the Master Coordinator terminal 220*a* informs the peer terminal 220*b* to update its system-wide configuration data 230*b*.

If, however, the configuration identifier 232*b* is not present in the revision history 234*a* of the Master Coordinator terminal 220*a*, then the Master Coordinator terminal 220*a* may assume that the system-wide configuration data 230*b* of the peer terminal 220*b* has diverged from the system-wide configuration data 230*a* of the Master Coordinator terminal 220*a* and may contain configuration data not present in its system-wide configuration data 230*a*. In which case, the terminal 220*a* may (a) request user intervention to delete the system-wide configuration data 230*b* on the diverged peer terminal 220*b*, and start fresh, (b) request a user to identify which portions of the system-wide configuration data 230*b* of the peer terminal 220*a* are correct and manually synchronize, or (c) attempt to automatically reconcile differences between the system-wide configuration data 230*b* of the peer terminal 220*b* and the system-wide configuration 230*a* of the Master Coordinator terminal 220*a* by examining the their contents and trying to establish patterns of similarity. In any case, the peer terminal 220*b* cannot continue being a part of the system 200 until the differences within the system-wide configuration data 230*a*, 230*b* are reconciled.

Accordingly, the peer terminal 220*b* in one embodiment may determine at 360 whether an update notification was received from Master Coordinator terminal 220*a* in response to its verification request. If an update notification is received, then the peer terminal 220*b* may determine that it can safely update its system-wide configuration data 230*b* to that of the Master Coordinator terminal 220*a*. Accordingly, the peer terminal 220*b* at 340 may obtain system-wide configuration data 230*a* from the Master Coordinator terminal 220*a* and update its system-wide configuration data 230*b* to the obtained system-wide configuration data 230*a*. However, if an update notification was not received from the Master Coordinator terminal 220*a*, then the peer terminal 220*b* may determine that its system-wide configuration data 230*b* is a possible branch of the system-wide configuration data 230*a* and that manual intervention is required. In which case, the peer terminal 220*b* at 370 may enter a Sync Failed state in which it may remove itself from the telephone network 200 and generate an alert. The alert (e.g., message on its display, flashing light, etc.) may inform the user that intervention may be required to configure the peer terminal 220*b* for the telephone network 200.

Referring now to FIG. 4, a method 400 used by the terminals 220*a-c* to update the system-wide configuration data is shown. As mentioned above, the terminals 220*a*-220*c* coordinate with one another to ensure that the Master Coordinator terminal 220*a*-200*c* stores the most up-to-date version of the system-wide configuration data 230*a-c*. Accordingly, in order to update the system-wide configuration data 230*a-c*, a peer terminal 220*a*-220*c* in one embodiment first obtains the role of Master Coordinator. In order to simplify the following description of method 400, terminal 220*a* is assumed to have the Master Coordinator role and terminal 220b is assumed to have a peer role. While the method 400 is described from the standpoint of terminal 220b, it should be appreciated that any of the terminals 220a-c when acting in the peer role may operate in accordance with the following described method 400.

At 410, the terminal 220b may determine to make a change to its system-wide configuration data 230b. The terminal 220b at 415 may determine whether it already is operating as the Master Coordinator. If the terminal 220b is already operating as the Master Coordinator, then it may proceed to 480 to update its system-wide configuration data 230b. However, as mentioned above, terminal 220b is operating as a peer. Accordingly, the terminal 220b proceeds to 420 and sends a master handoff request to terminal 220a which the terminal 220b believes to be operating as the Master Coordinator. In particular, the master handoff request sent to the terminal 220a includes the configuration identifier 232b for the peer terminal 220b.

At 425, the terminal 220b may wait for a response from the terminal 220a. Once a response form the terminal 220a is received, the terminal 220b may perform different actions based on the response. If the received response is an acknowledgment response, then terminal 220a has relinquished its role as Master Coordinator and assumed the role of a peer. Accordingly, the terminal 220b at 430 may assume the role of Master Coordinator and proceed to 480 to update its system-wide configuration data 230b.

However, if a locked response is received, then the terminal 220a has refused to relinquish the Master Coordinator role because the terminal 220a is preparing to update its system-wide configuration data 230a. In which case, the terminal 220b at 440 may wait for an announcement from the Master Coordinator of new system-wide configuration data 230a and update its system-wide configuration data 230b accordingly in response to such announcement. The terminal 220b may then return to 420 to send another master handoff request in order to obtain the Master Coordinator role.

If a not-master response is received, then the terminal 220a has already acknowledged a master handoff request of another terminal (e.g., terminal 220c) and has already relinquished the Master Coordinator role. In which case, the terminal 220b at 450 may wait for a beacon signal from the new Master Coordinator. The terminal 220b may then return to 420 to send master handoff request to the newly identified Master Coordinator in order to obtain the Master Coordinator role for itself.

If an out-of-date response is received, then the system-wide configuration data 230b of the terminal 220b does not match the system-wide configuration data 230a of the Master Coordinator terminal 220a. In which case, the terminal 220b at 460 may obtain the system-wide configuration data 230a from the Master Coordinator terminal 220a, and update its system-wide configuration data 230b accordingly. The terminal 220b may then return to 420 to send another master handoff request to the Master Coordinator terminal 220a in order to obtain the Master Coordinator role for itself.

If a configuration-branch response is receive, then the Master Coordinator terminal 220a has determined that the system-wide configuration data 230b of the requesting terminal 220b does not match its system-wide configuration data 230a, but has also determined the system-wide configuration data 230 of the requesting terminal 220b does not correspond to a prior system-wide configuration data of its revision history 234a. Hence, the Master Coordinator terminal 220a may assume a configuration branch has occurred with each terminal 220a, 220b containing some configuration data not contained in the other terminal's system-wide configuration data 230a, 230b. To preserve the integrity of the system-wide configuration data, the Master Coordinator terminal 220a prevents the requesting terminal 220b from propagating its system-wide configuration data 230b. Rather, the terminal 220b at 470 may transition to a Sync Failed state until the configuration branch can be resolved via other techniques, such as manual intervention by the user.

At 480, the terminal 220b has obtained the Master Coordinator role and is free to update its system-wide configuration data 230b. Desirably, the terminal 220b combines as many changes as possible into a single transaction to ensure all related data is changed atomically to reduce possible system instability in case another terminal 220a or 220c starts a transaction after part of the data is changed. After the system-wide configuration data 230b is updated, the terminal 220b generates a new configuration identifier 232b for the system-wide configuration data 230b and updates the revision history 234b. In one embodiment, the terminal 220b generates a random number for the configuration identifier 232b. The terminal 220b further inserts the newly generated configuration identifier 232 inserted into the revision history 234b to maintain a history of system-wide configuration data.

To protect against the case where the telephone system 200 becomes segmented into sub-part that operate independently from other sub-parts for a period of time, the configuration identifiers 232a-c are not sequentially generated. Rather, a new configuration identifier 232a-c is generated whenever there is a configuration update. Moreover, each terminal 220a-c may maintain its own random number generator, seeded by information unique to each terminal 220a-c (e.g., the terminal's Ethernet MAC address) to reduce the possibility of duplicate numbers from being independently generated in segmented sub-sites.

After updating the system-wide configuration data 230b, the terminal 220b at 490 generates beacon signals which include the new configuration identifier 232b and possibly the former configuration identifier. Peer terminals 220a, 220c receiving these beacon signals may recognize their system-wide configuration data 230a, 230c are out-of-date, and may request the updated system-wide configuration data from the Master Coordinator terminal 220b.

As explained above the terminals 220a-c may coordinate with one another to maintain system-wide configuration data. However, some types of terminals may need access to configuration data that is too large to be practically stored by all terminals 220a-c in the telephone system 200. One such type of terminal is a gateway terminal (e.g., terminals 120g-h of FIG. 1) that provides an auto-attendant feature. The auto-attendant, amongst other things, may automatically answer inbound calls, and play configurable voice prompts that permit a caller to request the auto-attendant to take further actions depending on the caller's response to such voice prompts.

The P2P telephone system 100 as shown in FIG. 1 may support multiple telephone gateways 120g-h providing auto-attendant resources. A small enterprise may desire all telephone gateways 120g-h provide auto-attendant resources having the same menu configuration and the same voice prompt files. However, the small enterprises may further desire that a user not be required to separately configure each auto-attendant resource, and re-record voice prompt files, for each gateway 120g-h in the system 100. Instead, the small enterprise may prefer that configuration of an auto-attendant resource include recording of voice-prompt files be done once and self-replicated to other auto-attendant resource in the system 100.

Figure 5:
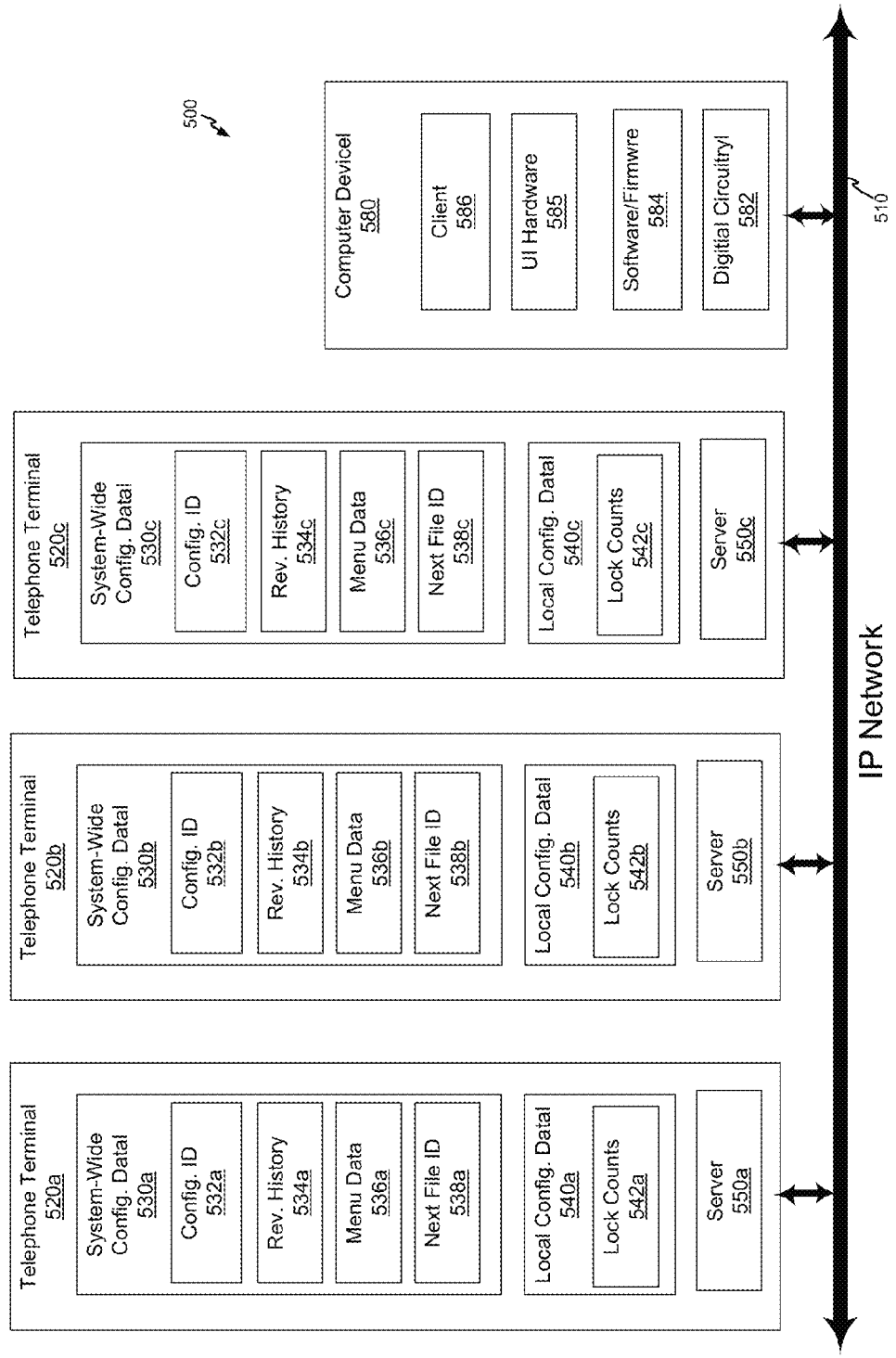
FIG. 5 is a simplified diagram of a P2P, IP telephone system, in accordance with an embodiment of the invention that provides auto-attendant functionality.

Details of such a process of self-replicating the configuration data of the auto-attendant resources is described below with reference to FIGS. 5-8, where FIG. 5 shows a simplified block diagram of the telephone system 100 that highlights aspects of a P2P, IP telephone system which relate to replicating the auto-attendant configuration data. In particular, FIG. 5 shows a telephone system 500, which may be implemented in a manner similar to the telephone system 100 of FIG. 1. The telephone system 200 is shown with a first gateway terminal 520a, a second gateway terminal 520b, an IP phone terminal 520c, and a computing device 580 coupled to one another via an IP network 510. While telephone system 500 is shown with three terminals 520, other embodiments of a P2P, IP telephone system may include a different number of terminals 520.

As shown, each terminal 520a-c may include system-wide configuration data 530a-c, local configuration data 540a-c, and a server 550a-c. The system-wide configuration data 530a-c may also include a configuration identifier 532a-c and a revision history 534a-c which the servers 550a-c use in a manner similar to the servers 250a-c of FIG. 2 to maintain up-to-date system-wide configuration data 530a-c in the terminals 520a-c.

The computing device 580 may include digital circuitry 582 (e.g., processors, memory, and control logic), software and/or firmware 584, and user interface hardware 585 (e.g., keyboard, mouse, display, etc.) that in combination present a user with a client 586 suitable for interacting with the servers 550a-c. In one embodiment, the client 586 comprises a conventional web browser (e.g., Firefox™, Chrome™, and Internet Explorer™ browsers). However, other embodiments of the computing device 580 may provide a propriety client for accessing servers 550a-c As shown in FIG. 5, besides the configuration identifiers 532a-c and revisions histories 534a-c, the system-wide configuration data 530a-c further includes auto-attendant menu data 536a-c and a next file identifier 538a-c. In this manner the auto-attendant menu data 536a-c and next file identifier 538a-c may be maintained among the terminals 520a-c as explained above in regard to FIGS. 2-4.

The auto-attendant menu data 536a-c, in one embodiment, comprises a collection of nodes, with each node identifying the series of acceptable user keypresses (e.g., dual-tone multi-frequency (DTMF) digits) and the action to take for each keypress. The auto-attendant data 536a-c further includes a collection of file identifiers for voice prompt files. In particular, each menu node may include file identifiers for specific voice prompt files to be played when that menu node is active.

In one embodiment, the menu data 536a-c is text based, and does not require much memory to define each node. As such, the menu data 536a-c may be contained in the system-wide configuration data 530a-c and distributed to all terminals 520a-c of the system 500 without placing a substantially storage burden on terminals that do not provide an auto-attendant resource.

When a voice prompt file is recorded, by any terminal 520a-c in the system 100, the terminal 520a-c assigns the voice prompt file a file identifier that is guaranteed to be unique system wide. As mentioned above, the system-wide configuration data 530a-c include a next file identifier 538a-c. When a terminal 520a-c records a voice prompt file and is ready to register the voice prompt file with the system 500, the terminal obtains the Master Coordinator role as explained above in regard to FIG. 4 so that the terminal 520a-c may update the system-wide configuration data 530a-c. After obtaining the Master Coordinator role, the terminal 520a-c locks the system-wide configuration data 530a-c (e.g., the terminal 520a-c returns a locked response to master handoff requests). The terminal 520a-c then may read the next file identifier 538a-c (guaranteed not to change because of the system-wide lock). The terminal 520a-c may then use the read next file identifier 538a-c for the current file, and increment the next file identifier 538a-c to update in the system-wide configuration data. In a manner similar to FIG. 4, the terminal 520a-c may then update the configuration identifier 532a-c and generate beacon signals using the updated configuration identifier 532a-c in order to propagate the change system-wide configuration data 530a-c throughout the system 500. With this approach, the next file identifier 538a-c is guaranteed to be unique across the system 500, even if there are other files being recorded at the same time by other terminals 520a-c in the system 500. The terminal 520a-c may then save the file using this read next file identifier 538a-c.

Other terminals (e.g. terminal 520a, 520b) that provide auto-attendant resources receive the system-wide configuration update and may parse the node definitions provided by the menu data 536a-c. Based upon such menu data 536a-c, the auto-attendant terminals 520a-b may update their node definitions which include the unique file identifier for the new voice prompt file. Each auto-attendant terminals 520a-b may recognize that it does not have a copy of the referenced voice prompt file. In which case, the auto-attendant terminal 520a-b may broadcast a request asking other terminals 520a-c in the system 500 for the file. Any terminal 520a-c that contains a copy of the requested file may then respond to the requesting terminal. The requesting terminal 520a-c may then make a specific request to one of the responding terminals 520a-c to retrieve a copy of the file. Any file transfer mechanism may be used to transfer the binary file to the requesting terminal 520a-c. However, in one embodiment, an HTTP GET request is used since each terminal 520a-c includes an HTTP server. The requesting terminal 520a-c now has a local copy of the file for playback if necessary for any auto-attendant call that accessing this menu.

The above described implementation provides a copy of file(s) to any terminal 520a-c at the time of the system-wide configuration data 530a-c is updated. However, in another embodiment, the terminal 520a-c may be implement to obtain a copy of the file not at the time of system-wide updates, but when an auto-attendant menu becomes active and the terminal 520a-c determines a copy of the related voice prompt file is not present in the device. While such an embodiment may introduce a slight delay during auto-attendant usage, data traffic may be reduced since the auto-attendant may never activate a given menu node. Alternatively, such an embodiment may help alleviate a spike in network data usage as the auto-attendant terminals are more likely to spread-out their requests the file and not all request the file over a short period of time.

To facilitate cleanup of unused files, the auto-attendant terminals 520a-b may implement a local file locking technique. Deleting a file from an auto-attendant terminal 520a-b simply because the file is no longer referenced by the system-wide configuration data 530a-c may result in problems. For example, an auto-attendant terminal 520a-b may have an active auto-attendant session when the system-wide configuration data 530a-c is updated. The active auto-attendant, however, may include references to files removed by the update. As such, the auto-attendant session should be completed before the files are removed from the auto-attendant terminal 520a-b.

To address such an issue, the auto-attendant terminals 520a-b, in one embodiment, maintain a lock count 542a-b in its local configuration data 540a-b for each file. If a file is referenced in the system-wide configuration data 530*a-b*, the terminals 520*a-b* increment the lock count for the file by one. If the file is used in an active auto-attendant session, the terminals 520*a-b* again increment the lock count 542*a-b* for that file by one. If the system-wide configuration data 530*a-b* is updated to no longer reference the file, then the terminals 520*a-b* decrement the lock count 542*a-b* by one. If an active session terminated that was using of the file, then the terminal 520*a-b* decrements that lock count 542*a-b* for the file by one. If the lock count 542*a-b* for a file has reached zero, then the file is no longer needed by the terminal 530*a-b* and may be deleted from the terminal 530*a-b*. As a protection technique, the terminals 530*a-b*, in one embodiment, require the lock count 542*a-b* to remain at zero for a period of time (e.g., 60 minutes) before deleting the file.

Figure 6:
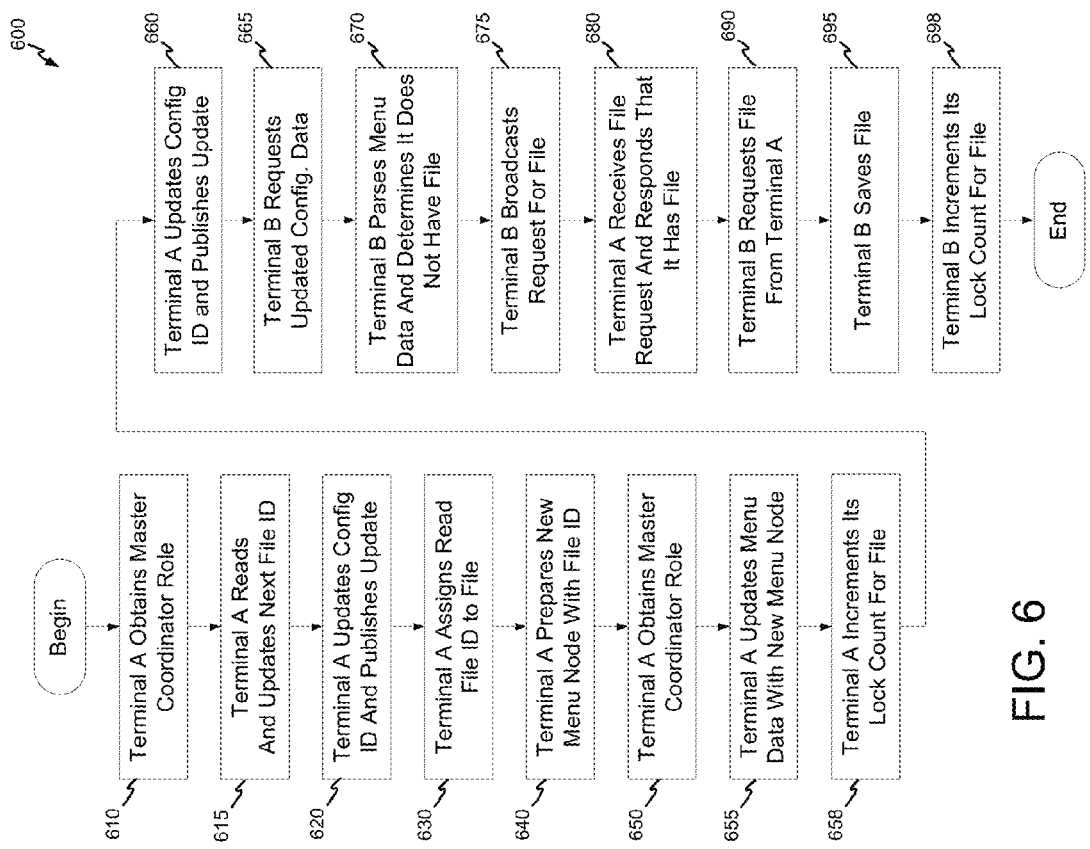
FIG. 6 is a flowchart showing a method used by an auto-attendant terminal to add a menu node to the auto-attendant menu data.

Referring now to FIG. 6, a flowchart shows illustrates the use of file identifiers and locking of files to add a node to the auto-attendant menu data 536*a-c*. As shown, gateway terminal 520*a* at 610 may obtain Master Coordinator role in order to update the system-wide configuration data 530*a*. As explained above in regard to FIG. 4, the gateway terminal 520*a* may send a master handoff request to obtain the Master Coordinator role.

After obtaining the Master Coordinator role, the gateway terminal 520*a* at 615 may read the next file identifier 538*a* to obtain its current value (e.g., 15), and increment the next file identifier 538*a* in the system-wide configuration data 540*a* to an updated value (e.g., 16). The gateway terminal 520*a* at 620 may further update the configuration identifier 532*a* and publish the updates by broadcasting beacon signals having the updated configuration identifier 532*a*. At 630, the gateway terminal 520*a* may assign the read file identifier (e.g. 15) to the newly recorded voice prompt file and save the file. The gateway terminal 520*a* may further register in its local configuration data 540*a* that it has a copy of the file (e.g., file 15).

At 640, the gateway terminal 520*a* may prepare a new auto-attendant menu node. In particular, the gateway terminal 520*a* may define the actions associated with the menu node including the file identifier (e.g. 15) for its associated voice prompt file. The gateway terminal 520*a* at 650 may again obtain the Master Coordinator role if it does not have such role already so that it may update the system-wide configuration data 530*a*. After obtaining the Master Coordinator role, the gateway terminal at 655 may update the menu data 536*a* of the system-wide configuration data 530*a* with the newly define menu node definition.

Since the system-wide configuration data 530*a* reference the file (e.g. 15), the gateway terminal 520*a* at 658 increments its lock count 542*a* for the file to an updated value (e.g., 1). The gateway terminal 520*a* at 660 may further update the configuration identifier 532*a* and publish the updates by broadcasting beacon signals having the updated configuration identifier 532*a*.

At 665, the other gateway terminal 520*b* may request and receive the updated system-wide configuration data 530*b*. The gateway terminal 520*b* at 670 may parse the menu data 536*b* of the update system-wide configuration data 530*b* and determine that the menu data 536 include a new menu definition with a file identifier (e.g., 15) of a file for which the gateway terminal 520*b* does not have a copy. Accordingly, the gateway terminal at 675 may broadcast a request for terminals 520*a-c* that contain a copy of the referenced file (e.g., 15).

At 680, the gateway 520*a* may receive the file request from gateway terminal 520*b* and responds to gateway terminal 520*b* that it has a copy of the requested file. The gateway terminal 520*b* at 690 may specifically request the gateway terminal 520*a* for a copy of the file (e.g., using an HTTP GET command) and thereby obtain a copy of the file from the gateway terminal 520*a*. At 695, the gateway terminal 520*b* may save the file and further register in its local configuration data 540*b* that it has a copy of the file (e.g., file 15). Since the system-wide configuration data 530*b* references the file (e.g. 15), the gateway terminal 520*b* at 698 increments its lock count 542*b* for the file to an updated value (e.g., 1).

Figure 7:
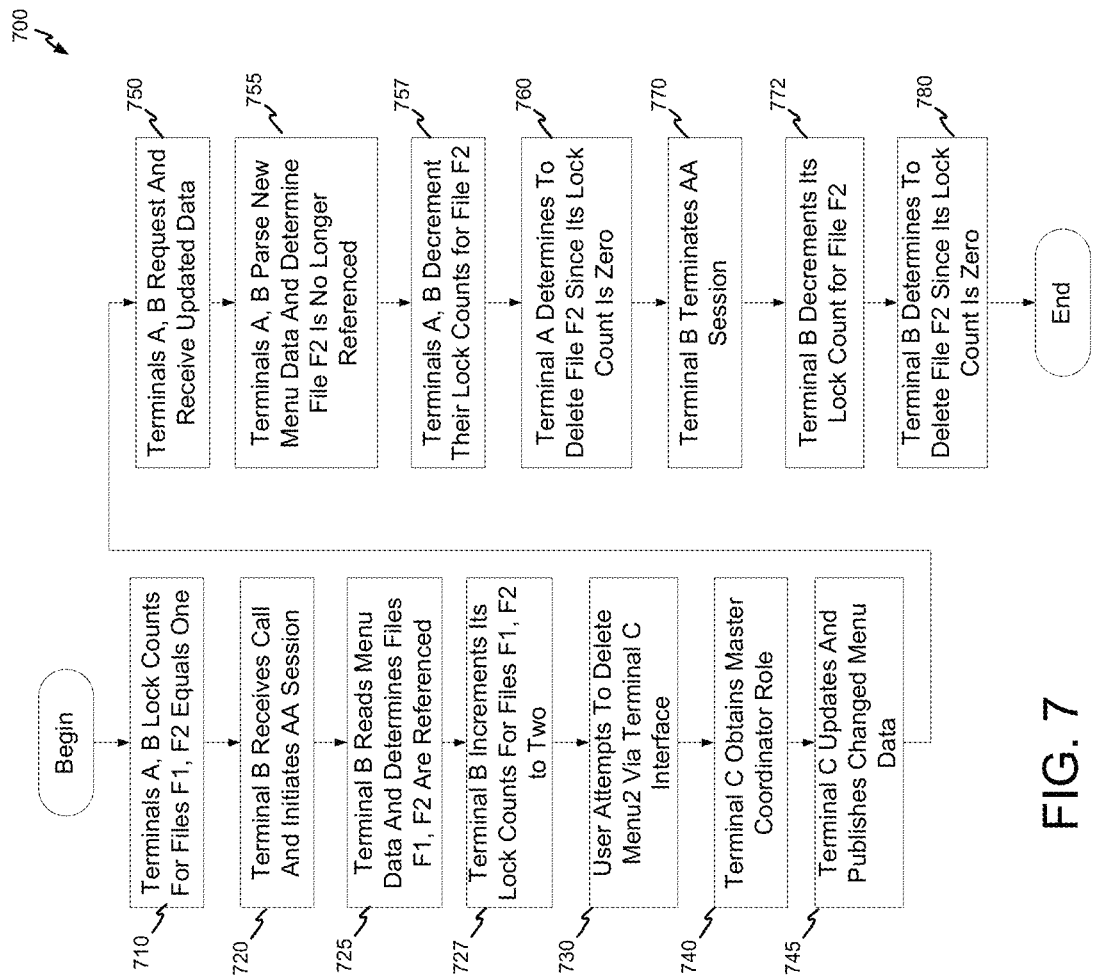
FIG. 7 is a flowchart showing a method used by an auto-attendant terminal to remove a menu node from the auto-attendant menu data.

Referring now to FIG. 7, a flowchart shows the use of file identifiers and lock counts during the removal of a menu node from the auto-attendant menu data 536*a-c*. The following description assumes that the menu data 536*a-c* includes a first menu node Menu1 that includes a first file identifier (e.g. 21) for a first file F1 and a second menu node Menu2 that includes a second identifier (e.g. 24) for a second file F1. At 710, the lock count 542*a-b* for the first file F1 and the lock count 542*a-b* for a second file F2 are both one since neither gateway terminal 520*a-b* has an active auto-attendant session but the system-wide configuration data 530*a-c* references the files. At 720, an inbound call is received on gateway terminal 520*b* and initiates an auto-attendant session to service the call. In response to initiating the auto-attendant session, the gateway terminal 520*b* at 725 reads its menu data 536*b* and determines that menu data 536*b* references both file F1 and file F2. Accordingly, the gateway terminal 520*b* at 727 increments the file lock count 542*a-b* for files F1 and F2, thus resulting in both files having a lock count 542*a-b* of two.

At 730, an end-user uses a client computing device 580 to access an interface provided by IP telephone terminal 520*c* and deletes menu node Menu2 during the auto-attendant session of the gateway terminal 230*b*. In response to such requested change to the system-wide configuration data 530*c*, the telephone terminal 520*c* at 740 may request and obtain the Master Coordinator role. After obtaining the Master Coordinator role, the telephone terminal 520*c* at 745 may further update the configuration identifier 532*c* and publish the updates by broadcasting beacon signals having the updated configuration identifier 532*c*.

At 750, both gateway terminals 520*a-b* in response to the beacon signals may request and receive the updated system-wide configuration data 530*a-b*. The gateway terminals 520*a-b* at 755 may further parse the auto-attendant menu data 536*a-b* and determine that the menu node Menu2 has been deleted and that file F2 is no longer referenced by the updated system-wide configuration data 530*a-b*. Accordingly, each gateway terminals 520*a-b* at 757 decrements its lock count 542*a-b* for file F2. In particular, the lock count 542*a* in the gateway terminal 520*a* is reduced to zero since it does not have an active auto-attendant session. However, the lock count 542*a* in the gateway terminal 520*b* is reduced to one since it does have an active auto-attendant session.

At 760, the gateway terminal 520*a* determines that the lock count 542*a* for file File2 is zero, and deletes the file File2 from its storage, perhaps after a time delay as described above. As such, file File2 no longer exists in gateway terminal 520*a*.

At 770, the gateway terminal 520*b* has terminated the auto-attendant session (e.g., the caller has hung up, or has been transferred to an extension or other terminal 520*a-c* in the system 500). In response to the auto-attendant session terminating, the gateway terminal 520*b* at 772 decrements the lock counts 542*b* on both file File1 and file File2. File File1 now has a lock count 542*b* of one, and file File2 now has a lock count of zero.

At 780, the gateway terminal 520*b* determines that the lock count 542*b* for file File2 is zero, and deletes the file File2 from its storage, perhaps after a time delay as described above. As such, file File2 no longer exists in gateway terminal 520*b*.

The above described usage of file identifiers and lock counts is not exclusively for the auto-attendant configuration. File identifiers and lock counts may be used to share other types of files in the system 500. For example, voice tags are small voice prompt files that are recorded for each extension user and is played when a remote caller searches through the company directory. If a matching name is found, the voice tag is played to the far end caller so he can confirm whether this matching name entry is correct. The voice tag recording, in one embodiment, is present on all gateways terminals as well as on the specific extension that matches the specific users voice tag for recording and management purposes. The above described file exchange and copying process may used in this case, where the file is given a unique file identifier in the telephone system, and the system-wide configuration data include the unique file identifier for the file. Terminals may access the file by using the unique file identifier to request a copy from wherever the file may reside in the system. If the file is re-recorded, the previous file is deleted, and a new file (with a new file ID) is added to the system, and shared using the mechanism above.

A benefit of this system is there is inherent redundancy in the system. Copies of the file are maintained on multiple terminals in the system. If one of such terminals becomes unusable its configuration is deleted or restored to factory defaults in order to revive the terminal, then copies of the files are available on other terminals on the system, and may be copied back to the revived terminal after it obtains the current version of the system-wide configuration data that references these files. A new device (e.g., with auto-attendant functionality) that is added to the system also obtain copies of the files automatically after the new device joins the system, obtains a copy of the current system-wide configuration data, and sees the references to the various files.

Various embodiments of the invention are described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible computer readable medium such as, for example, flash memory devices, hard disk devices, compact disc media, DVD media, EEPROMs, etc. Such instruction when executed by a telephone terminal or other device, may configure the telephone terminal or other device to perform tasks associated with receiving requests for configuration data residing on other telephone terminals and acting as a proxy for such requests for configuration data.

One skilled in the art would readily appreciate that many modifications and variations of the disclosed embodiments are possible in light of the above teachings. Thus, it is to be understood that, within the scope of the appended claims, aspects of the disclosed embodiments may be practiced in a manner other than as described above.

What is claimed is:

1. A telephone terminal of a peer-to-peer telephone system comprising a plurality of telephone terminals, the telephone terminal comprising:
    circuitry configured to couple the telephone terminal to an Internet Protocol (IP) network of the peer-to-peer telephone system, store for the telephone terminal system-wide configuration data comprising data used to configure each telephone terminal of the peer-to-peer telephone system for one or more telephony features of the peer-to-peer telephone system, and store files for the telephone terminal; and
    a server configured to determine whether the system-wide configuration data references a file not stored by the circuitry, wherein the file comprises further configuration data used to configure each telephone terminal of the peer-to-peer telephone system for one or more telephony features of the peer-to-peer telephone system, and request the file from another telephone terminal of the peer-to-peer telephone system in response to determining that the circuitry does not store the file;
    wherein a second telephone terminal is configured to transmit to a first telephone terminal a master handoff request comprising a configuration identifier for the system-wide configuration stored by the second telephone terminal, and wherein the second telephone terminal, in response to changing the system-wide configuration data for the telephone system, is configured to update the configuration identifier;
    wherein the circuitry is further configured to store a lock count for each stored file, wherein each lock count tracks active references to its respective stored file, and the server is further configured to increment the lock count of a file in response to determining that the system-wide configuration data newly references the file;
    wherein the server is further configured to decrement the lock count of a file in response to determining that the system-wide configuration data no longer references the file, wherein the server is configured to establish an auto-attendant session in response to an inbound call, and to increment the lock count of a file associated with the auto-attendant session in response to establishing the auto-attendant session, and wherein the server is configured to decrement the lock count of a file associated with the auto-attendant session in response to terminating the auto-attendant session.

2. The telephone terminal of claim 1, wherein the server is configured to delete the file in response to determining that the lock count has a predetermined value.

3. The telephone terminal of claim 1, wherein the server is configured to delete the file in response to determining that the lock count has a predetermined value for a predetermined time period.

4. A method for maintaining configuration data in a peer-to-peer telephone system comprising a plurality of telephone terminals, the method comprising:
    storing system-wide configuration data and files referenced by the system-wide configuration data in a telephone terminal of the peer-to-peer telephone system, wherein the system-wide configuration data and the referenced files comprise data used to configure each telephone terminal of the peer-to-peer telephone system for one or more telephony features of the peer-to-peer telephone system;
    determining whether the system-wide configuration data references a file that is not stored in the telephone terminal;
    requesting the file from another telephone terminal of the peer-to-peer telephone system in response to determining that the telephone terminal does not have the file stored;
    storing a lock count for each stored file, wherein each lock count tracks active references to its respective stored file;
    incrementing the lock count of a file in response to determining that the system-wide configuration data newly references the file;

decrementing the lock count of the file in response to determining that the system-wide configuration data no longer references the file;

establishing an auto-attendant session in response to the telephone terminal receiving an inbound call;

incrementing a lock count of a file associated with the auto-attendant session in response to establishing the auto-attendant session; and decrementing the lock count of a file associated with the auto-attendant session in response to terminating the auto-attendant session.

5. The method of claim 4, further comprising deleting a file in response to determining that the lock count for the file has a predetermined value.

6. The method of claim 4, further comprising deleting a file in response to determining that the lock count for the file has a predetermined value for a predetermined time period.

7. A non-transitory computer readable medium comprising a plurality of instructions, that in response to being executed, configure an Internet Protocol (IP) telephone terminal of a peer-to-peer telephone system comprising a plurality of telephone terminals to:

store system-wide configuration data and files referenced by the system-wide configuration data, wherein the system-wide configuration data and the referenced files comprise data used to configure each telephone terminal of the peer-to-peer telephone system for one or more telephone features of the peer-to-peer telephone system;

determine whether the system-wide configuration data references a file that is not stored in the IP telephone terminal;

request the file from another telephone terminal of the peer-to-peer telephone system in response to determining the IP telephone terminal does not have the file stored;

store a lock count for each stored file, wherein each lock count tracks active references to its respective stored file;

increment the lock count of a file in response to determining that the system-wide configuration data newly references the file;

decrement the lock count of the file in response to determining that the system-wide configuration data no longer references the file;

establish an auto-attendant session in response to the telephone terminal receiving an inbound call;

increment a lock count of a file associated with the auto-attendant session in response to establishing the auto-attendant session; and decrement the lock count of a file associated with the auto-attendant session in response to terminating the auto-attendant session.

8. The non-transitory computer readable medium of claim 7, wherein the plurality of instructions further configure the IP telephone terminal to delete a file in response to determining that the lock count for the file has a predetermined value.

* * * * *

UNITED STATES PATENT AND TRADEMARK OFFICE
CERTIFICATE OF CORRECTION

PATENT NO.        : 8,737,384 B2                                Page 1 of 1
APPLICATION NO.   : 12/987862
DATED             : May 27, 2014
INVENTOR(S)       : Rose It is certified that error appears in the above-identified patent and that said Letters Patent is hereby corrected as shown below:

On the Title Page, Item [57] Line 2, delete "(P2P" and insert --(P2P)--

In the Specification

Column 1, Line 7, delete "(P-2P)" and insert --(P2P)--

Column 1, Line 16, delete "typical" and insert --typically--

Column 17, Line 10, delete "gateways" and insert --gateway--

Column 17, Line 13, insert --be-- after "may" and before "used"

Signed and Sealed this
Nineteenth Day of August, 2014

Michelle K. Lee
*Deputy Director of the United States Patent and Trademark Office*